(12) United States Patent
Chen

(10) Patent No.: US 12,172,554 B2
(45) Date of Patent: Dec. 24, 2024

(54) SIDE IMPACT PROTECTION LINKAGE MECHANISM AND SAFETY SEAT BASE

(71) Applicant: Bambino Prezioso Switzerland AG, Steinhausen (CH)

(72) Inventor: Hongbo Chen, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 296 days.

(21) Appl. No.: 17/776,582

(22) PCT Filed: Nov. 13, 2020

(86) PCT No.: PCT/EP2020/082043
§ 371 (c)(1),
(2) Date: May 12, 2022

(87) PCT Pub. No.: WO2021/094523
PCT Pub. Date: May 20, 2021

(65) Prior Publication Data
US 2022/0379782 A1 Dec. 1, 2022

(30) Foreign Application Priority Data
Nov. 15, 2019 (CN) .......................... 201911124365.4

(51) Int. Cl.
*B60N 2/28* (2006.01)
*B60N 2/42* (2006.01)

(52) U.S. Cl.
CPC ......... *B60N 2/2884* (2013.01); *B60N 2/2821* (2013.01); *B60N 2/4235* (2013.01)

(58) Field of Classification Search
CPC ...... B60N 2/26; B60N 2/2821; B60N 2/2851; B60N 2/2884; B60N 2/4235; B60R 2021/0006; B60R 2021/006
(Continued)

(56) References Cited

U.S. PATENT DOCUMENTS 5,800,012 A    9/1998  Ziegler
9,211,820 B2 * 12/2015  Allen .................. B60N 2/4235
(Continued)

FOREIGN PATENT DOCUMENTS

CN    106394337 A    2/2017
CN    207550009 U    6/2018
(Continued)

OTHER PUBLICATIONS

"International Search Report" mailed on Feb. 2, 2021 for International application No. PCT/EP2020/082043, International filing date:Nov. 13, 2020.

*Primary Examiner* — Jason S Daniels
(74) *Attorney, Agent, or Firm* — Winston Hsu

(57) ABSTRACT

A side impact protection linkage mechanism (100) includes a side impact protection block (10). The side impact protection block (10) is pivotally connected to a side wall (20) of a safety seat base (200) and has a folded position attached to the side wall (20) and an expanded position away from the side wall (20). A support frame (11) is disposed in the side wall (20). The support frame (11) is equipped with an engaging member (12) and a linkage member (13). An end of the engaging member (12) is pivotally connected to the support frame (11) and another end of the engaging member (12) has a lock portion (120) slidably protruding from the side wall (20). The engaging member (12) is detachably engaged with the side impact protection block (10) through the lock portion (120). The linkage member (13) is disposed below the engaging member (12) and capable of sliding upward and downward along the support frame (11). The linkage member (13) is configured to drive the engaging member (12) rotate downward.

16 Claims, 14 Drawing Sheets

(58) Field of Classification Search
USPC .......................................................... 296/68.1
See application file for complete search history.

(56) References Cited

U.S. PATENT DOCUMENTS

| 11,745,629 | B2 * | 9/2023 | Mo | ...................... B60N 2/2851 |
|---|---|---|---|---|
| | | | | 297/216.11 |
| 2015/0336482 | A1 | 11/2015 | Pos | |
| 2018/0244178 | A1 | 8/2018 | Pos | |
| 2019/0176746 | A1 | 6/2019 | Chen | |
| 2020/0101876 | A1 * | 4/2020 | Cui | ...................... B60N 2/2884 |

FOREIGN PATENT DOCUMENTS

| CN | 209063931 U | 7/2019 | | |
|---|---|---|---|---|
| CN | 106394337 B | 8/2019 | | |
| CN | 110126773 A | 8/2019 | | |
| EP | 3006261 A1 * | 4/2016 | ........... | B60N 2/2821 |
| JP | 2018-526279 A | 9/2018 | | |
| WO | 2013/189819 A1 | 12/2013 | | |

* cited by examiner

SIDE IMPACT PROTECTION LINKAGE MECHANISM AND SAFETY SEAT BASE

FIELD OF THE INVENTION

The present invention relates to a child safety seat base, particularly a side impact protection linkage mechanism applied to a safety seat base and the safety seat base.

BACKGROUND OF THE INVENTION

A child safety seat is a device that is installed on a car seat and restrains children thereon through a restraint device. In the case of an emergency braking or accidental collision of the car, the safety seat reduces the damage to the children by a casing thereof and restrains the body movement of children by the restraint device, so as to reduce the injury of children in the accident and ensure the safety of children in the car.

The child safety seat includes a base and a seat body detachably disposed on the base. In order to provide side impact protection, a lateral protection device is usually disposed on a side of the seat body of the child safety seat, and the lateral protection device a foldable structure. That is to say, the lateral protection device needs to be opened manually to provide protection when the child is seated in the seat and the lateral protection device needs to be folded to avoid occupying the lateral space when the child leaves the seat. However, when the child safety seat is being used, a user often neglects to manually open the lateral protection device, resulting in that the lateral protection device cannot function well.

At present, some lateral protection devices may be opened automatically. However, the structure of a driving mechanism for driving the lateral protection device is more complicated and the response is not sensitive enough. Therefore, it is necessary to improve the driving mechanism of the lateral protection device.

SUMMARY OF THE INVENTION

The present invention aims at providing a side impact protection linkage mechanism with simple structure and sensitive response.

The present invention further aims at providing a safety seat base equipped with a side impact protection linkage mechanism, wherein the side impact protection linkage mechanism has simple structure and sensitive response.

This is achieved by a side impact protection linkage mechanism according to claim 1 and a safety seat base according to claim 16. The dependent claims pertain to corresponding further developments and improvements.

As will be seen more clearly from the detailed description following below, the claimed side impact protection linkage mechanism is applied to a safety seat base. The side impact protection linkage mechanism includes a side impact protection block pivotally connected to a side wall of the safety seat base and having a folded position attached to the side wall and an expanded position away from the side wall. The side impact protection block has a tendency to rotate to the expanded position. A support frame is disposed in the side wall. The support frame is equipped with an engaging member and a linkage member. An end of the engaging member is pivotally connected to the support frame and another end of the engaging member has a lock portion slidably protruding from the side wall. The engaging member is detachably engaged with the side impact protection block through the lock portion, such that the side impact protection block is locked at the folded position and able to be unlocked. The linkage member is disposed below the engaging member and capable of sliding upward and downward along the support frame. The linkage member is configured to drive the engaging member to rotate downward, such that the lock portion is disengaged from the side impact protection block. Furthermore, the side impact protection linkage mechanism further includes a driving member disposed on the safety seat base and connected to the linkage member.

Compared to the prior art, the side impact protection linkage mechanism of the invention disposes the support frame in the side wall of the safety seat base and installs the engaging member and the linkage member on the support frame, wherein the engaging member is close the side impact protection block and the linkage member is located below the engaging member. When the linkage member moves downward along the support frame, the engaging member is driven to rotate downward, such that the lock portion of the engaging member is separated from the side impact protection block, so as to unlock the engaging member from the side impact protection block. Then, the side impact protection block extends out of the safety seat base and enters working state. Accordingly, by means of using the support frame to connect the engaging member and the linkage member with the aforesaid structures, the invention has the advantages of simple structure and sensitive response. Furthermore, the safety seat base is further equipped with the driving member connected to the linkage member. When the safety seat base is being used, the driving member is forced to drive the linkage member to move downward, thereby automatically triggering the action of the engaging member. Accordingly, the operation of the invention is convenient.

Preferably, the linkage member has a hook portion extending toward the engaging member and the engaging member has a wing plate adapted to the hook portion. When the linkage member moves downward, the hook portion cooperates with the wing plate to drive the engaging member to rotate downward.

Preferably, the support frame has two first longitudinal grooves opposite to each other, the linkage member has two protruding shafts adapted to the two first longitudinal grooves, and the linkage member is slidably connected to the support frame by cooperation between the two protruding shafts and the two first longitudinal grooves.

Preferably, a first elastic member is disposed between a lower end of the linkage member and the support frame, and the first elastic member provides an elastic force for driving the engaging member to move upward along the support frame.

Preferably, a first torsion spring is sleeved on a pivot shaft of the engaging member and the first torsion spring is configured to drive the engaging member to rotate upward.

Preferably, the driving member is connected to the linkage member by a drag member.

Preferably, the side impact protection block is pivotally connected to the side wall of the safety seat base by a pivot socket, a second torsion spring is sleeved on a pivot shaft of the pivot socket, and the second torsion spring provides a driving force for driving the side impact protection block to rotate toward the expanded position.

Preferably, the pivot socket has a positioning member capable of sliding into or out of the pivot socket and the side wall of the safety seat base has a positioning hole corresponding to the positioning member. When the side impact protection block rotates to the expanded position, the positioning member enters the positioning hole to lock the side impact protection block at the expanded position.

Preferably, the pivot socket further has an engaging hole adapted to the lock portion of the engaging member. When the side impact protection block rotates to the folded position, the lock portion cooperates with the engaging hole to fix the side impact protection block at the folded position.

Preferably, the side impact protection block further has an unlock member connected to the positioning member and the unlock member is operated to remove the positioning member from the positioning hole.

Preferably, the unlock member includes a first linkage rod and a second linkage rod. The first linkage rod has a first pivot portion, a second pivot portion, and a third pivot portion, wherein the first pivot portion and the second pivot portion are located at opposite ends of the first linkage rod, and the third pivot portion is located between the first pivot portion and the second pivot portion. The first linkage rod is pivotally connected to the positioning member by the first pivot portion. The first linkage rod is pivotally connected to the second linkage rod by the second pivot portion. The first linkage rod is pivotally connected to the side impact protection block by the third pivot portion. An end of the second linkage rod has an operating portion away from the first linkage rod. The operating portion has a rib protruding toward a bottom wall of the side impact protection block.

Preferably, a hollow chamber is formed in the positioning member, a side wall of the positioning member has a second longitudinal groove communicating with the hollow chamber, and a pivot shaft of the side impact protection block passes through the second longitudinal groove and the hollow chamber.

Preferably, a second elastic member is disposed in the hollow chamber and the second elastic member provides an elastic force for driving the positioning member to automatically extend out of the pivot socket.

Preferably, an end of the driving member is pivotally connected to the safety seat base, another end of the driving member has a protruding portion protruding from the safety seat base, and the drag member is connected to an end of the driving member where the protruding portion is located at.

Preferably, an elastic member is disposed between the driving member and the safety seat base and configured to automatically return the driving member.

As will be seen more clearly from the detailed description following below, the claimed safety seat base is equipped with the aforesaid side impact protection linkage mechanism.

BRIEF DESCRIPTION OF THE DRAWINGS

In the following, the invention is further illustrated by way of example, taking reference to the accompanying drawings thereof.

DETAILED DESCRIPTION

In order to explain the disclosure, structural features, principle, and achieved effects in detail, the invention will be further described with the embodiments and drawings in the following.

Figure 1:
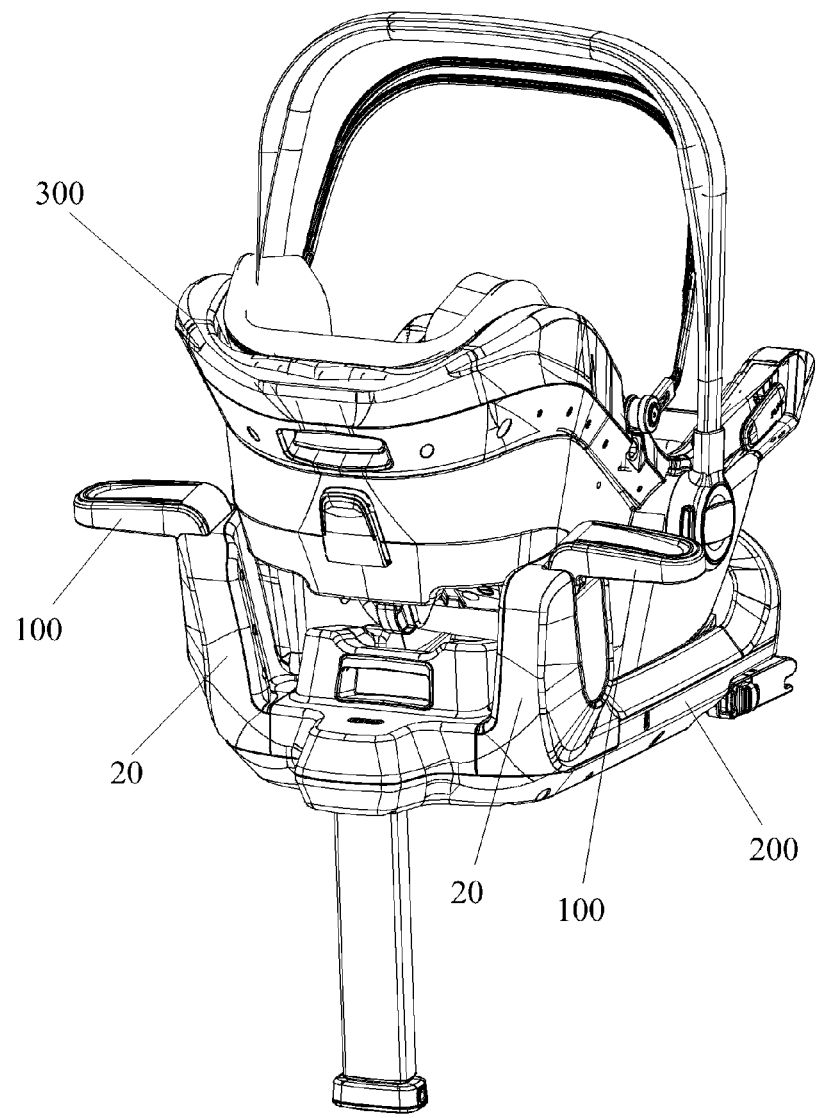
FIG. 1 is a schematic view illustrating the assembly of a safety seat base and a seat body according to an embodiment of the invention, wherein a side impact protection block is located at an expanded position.
Figure 2:
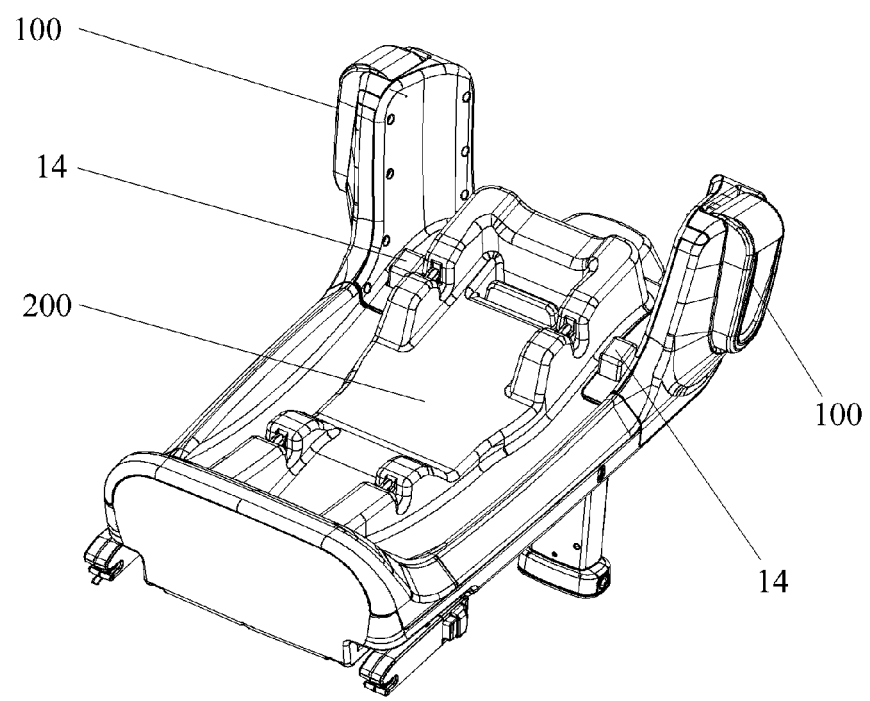
FIG. 2 is a schematic view illustrating a safety seat base according to an embodiment of the invention, wherein a side impact protection block is located at a folded position.
Figure 3:
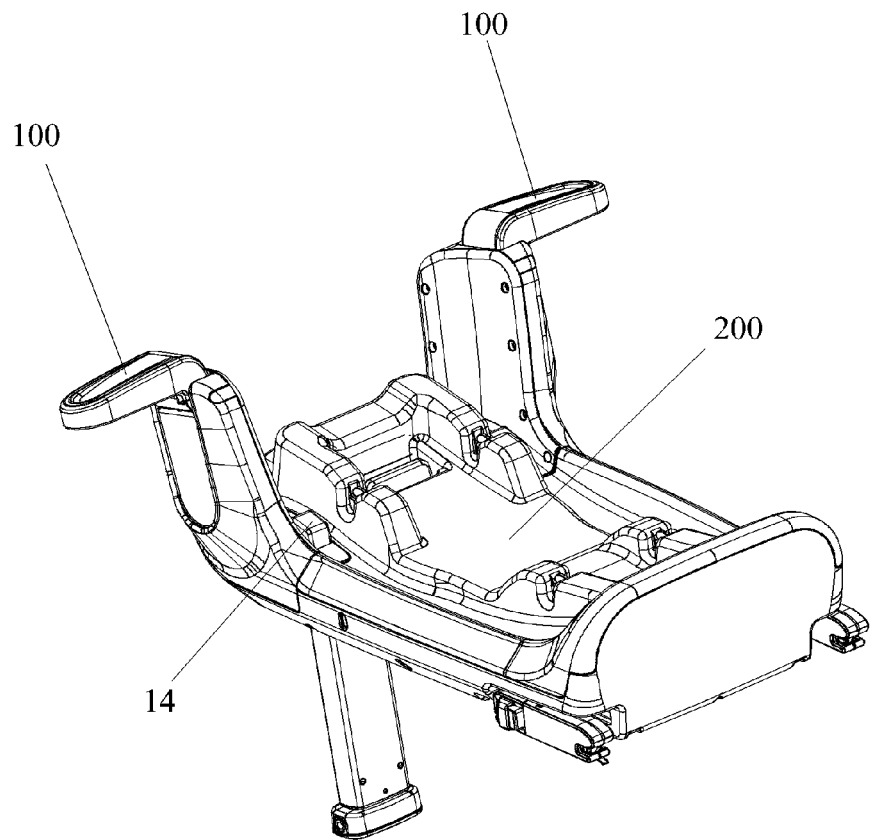
FIG. 3 is a schematic view illustrating a safety seat base according to an embodiment of the invention, wherein a side impact protection block is located at an expanded position.

As shown in FIGS. 1 to 7, the invention provides a safety seat base 200. Two side impact protection linkage mechanisms 100 are installed on two side walls 20 of the safety seat base 200, respectively. The side impact protection linkage mechanism 100 includes a side impact protection block 10. The side impact protection block 10 is pivotally connected to the side wall 20 of the safety seat base 200 and has a folded position attached to the side wall 20 (as shown in FIGS. 1 and 2) and an expanded position away from the side wall 20 (as shown in FIG. 3). The side impact protection block 10 has a tendency to rotate to the expanded position. When the safety seat base 200 is being used with a seat body 300, the side impact protection blocks 10 on both sides automatically expand to protect a person on the safety seat base 200 from direct impact. In order to simplify a driving mechanism of the side impact protection linkage mechanism 100 and enhance the sensitivity thereof, in this embodiment, the side impact protection linkage mechanism 100 further includes a support frame 11 disposed in the side wall 20 of the safety seat base 200. The support frame 11 is equipped with an engaging member 12 and a linkage member 13 located below the engaging member 12. An end of the engaging member 12 is pivotally connected to the support frame 11 and another end of the engaging member 12 has a lock portion 120 slidably protruding from the side wall 20. The engaging member 12 is detachably engaged with the side impact protection block 10 through the lock portion 120, such that the side impact protection block 10 is locked at the folded position and able to be unlocked. The linkage member 13 is capable of sliding upward and downward along the support frame 11 to drive the engaging member 12 to rotate downward, such that the lock portion 120 is disengaged from the side impact protection block 10, so as to unlock the side impact protection block 10. Furthermore, the side impact protection linkage mechanism 100 further includes a driving member 14 disposed on the safety seat base 200 and connected to the linkage member 13. When the safety seat base 200 is being used, the driving member 14 is pressed to drive the linkage member 13 to move downward along the support frame 11. The linkage member 13 drives the engaging member 12 to rotate downward while moving downward, such that the lock portion 120 of the engaging member 12 ejects from the side impact protection block 10. Consequently, the side impact protection block 10 rotates from the folded position to the expanded position.

Figure 14:
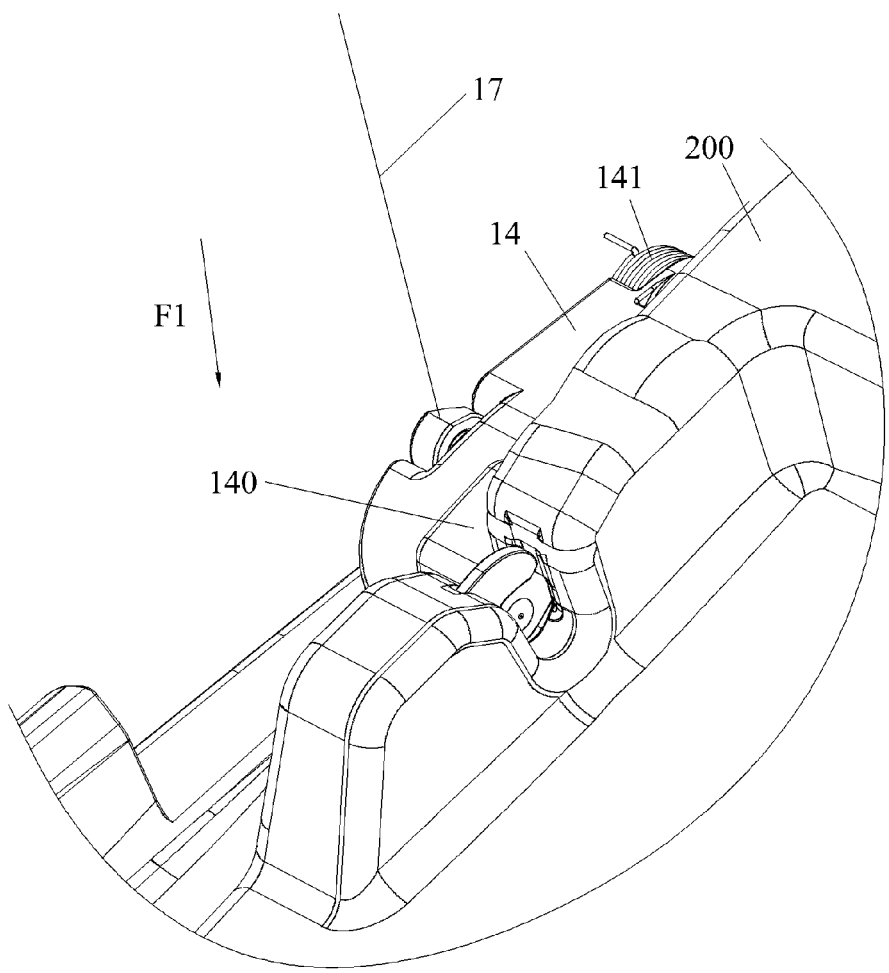
FIG. 14 is a schematic view illustrating the inside of a driving member according to an embodiment of the invention.

As shown in FIG. 14, an end of the driving member 14 is pivotally connected to the safety seat base 200, another end of the driving member 14 has a protruding portion 140 protruding from the safety seat base 200, and a drag member 17 is connected to an end of the driving member 14 where the protruding portion 140 is located at. In this embodiment, the drag member 17 is a steel wire. When the safety seat base 200 is being used, the protruding portion 140 is pressed to move downward to drive the linkage member 13 to move downward through the steel wire. Furthermore, an elastic member 141 may be further disposed between the driving member 14 and the safety seat base 200 and configured to automatically return the driving member 14. The elastic member 141 may be a torsion spring, a tension spring, or the like.

Figure 6:
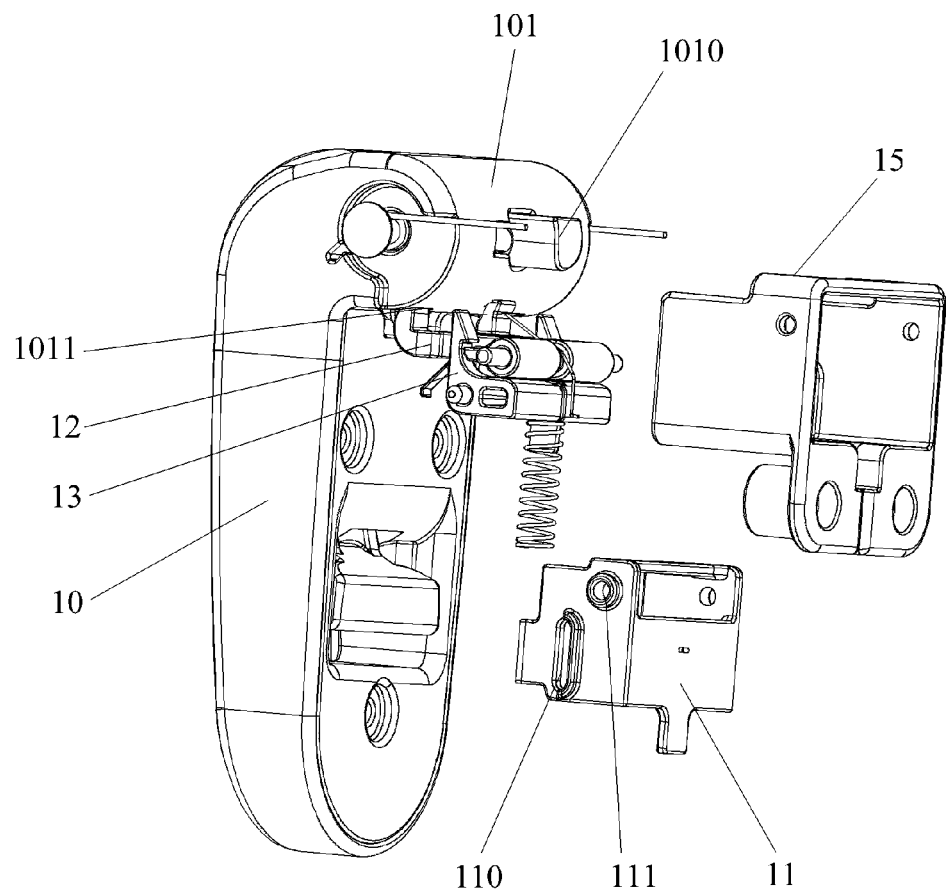
FIG. 6 is an enlarged view illustrating an area A shown in FIG. 5.
Figure 7:
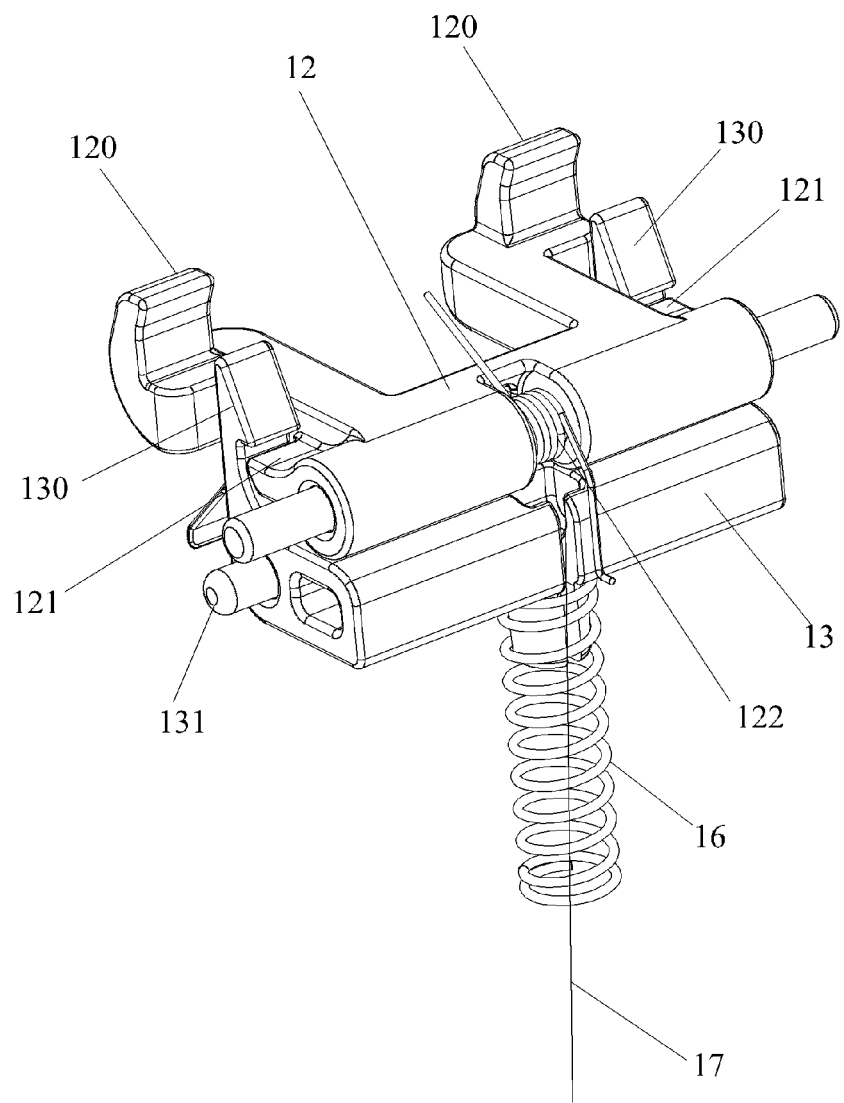
FIG. 7 is a schematic view illustrating an engaging member connected to a linkage member according to an embodiment of the invention.

The preferred connection between the linkage member 13 and the engaging member 12 is shown in FIGS. 6 and 7. The linkage member 13 has a hook portion 130 extending toward the engaging member 12 and the engaging member 12 has a wing plate 121 adapted to the hook portion 130. In this embodiment, the wing plate 121 extends from an end close to a pivot shaft of the engaging member 12 toward an end of the lock portion 120. When the linkage member 13 moves downward, the hook portion 130 pulls the wing plate 121 downward to drive the engaging member 12 to rotate downward, such that the lock portion 120 is disengaged from the side impact protection block 10. Furthermore, the support frame 11 has two bearing holes 111 opposite to each other. The pivot shaft of the engaging member 12 is pivotally connected to the support frame 11 through the two bearing holes 111. Still further, the support frame 11 has two first longitudinal grooves 110 opposite to each other and the linkage member 13 has two protruding shafts 131 adapted to the two first longitudinal grooves 110. The linkage member 13 is slidably connected to the support frame 11 by cooperation between the two protruding shafts 131 and the two first longitudinal grooves 110. When the steel wire is forced to pull the linkage member 13, the linkage member 13 moves downward along the first longitudinal grooves 110.

As shown in FIG. 7, in order to make the linkage member 13 return automatically, a first elastic member 16 is disposed between a lower end of the linkage member 13 and the support frame 11. The first elastic member 16 provides an elastic force for driving the engaging member 12 to move upward along the support frame 11. When the linkage member 13 is pulled to move downward, the first elastic member 16 is compressed to deform elastically. When the pulling force exerted on the linkage member 13 disappears, the elastic force of the first elastic member 16 pushes the linkage member 13 back to the upper end, such that the linkage member 13 automatically returns. Moreover, in order to make the engaging member 12 have a tendency to rotate upward to position the side impact protection block 10 at the expanded position, a first torsion spring 122 is sleeved on a pivot shaft of the engaging member 12. A free end of the first torsion spring 122 abuts against the engaging member 12 and another free end of the first torsion spring 122 abuts against the support frame 11.

Figure 8:
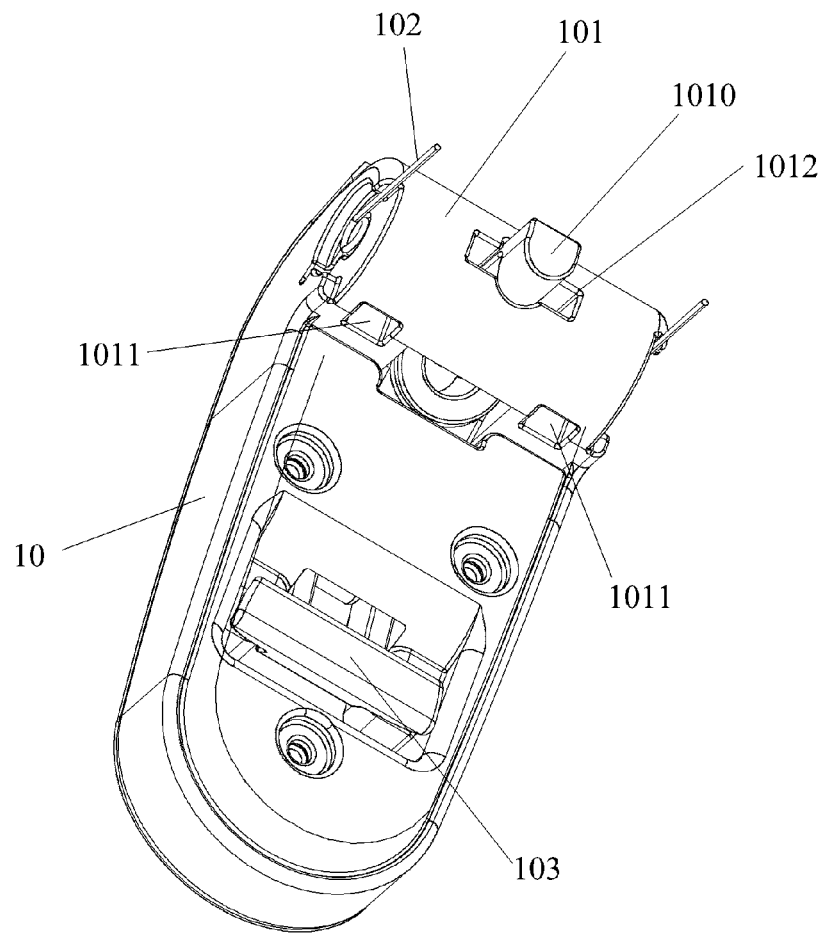
FIG. 8 is a schematic view illustrating a side impact protection block according to an embodiment of the invention.

As shown in FIG. 8, the side impact protection block 10 is pivotally connected to the side wall 20 of the safety seat base 200 by a pivot socket 101. In this embodiment, the pivot socket 101 is a cylindrical structure integrally formed with the side impact protection block 10. A second torsion spring 102 is sleeved on a pivot shaft of the pivot socket 101. The second torsion spring 102 provides a driving force for driving the side impact protection block 10 to rotate toward the expanded position. When the driving member 14 unlocks the engaging member 12 from the side impact protection block 10, the side impact protection block 10 automatically rotates to the expanded position by the second torsion spring 102.

Figure 4:
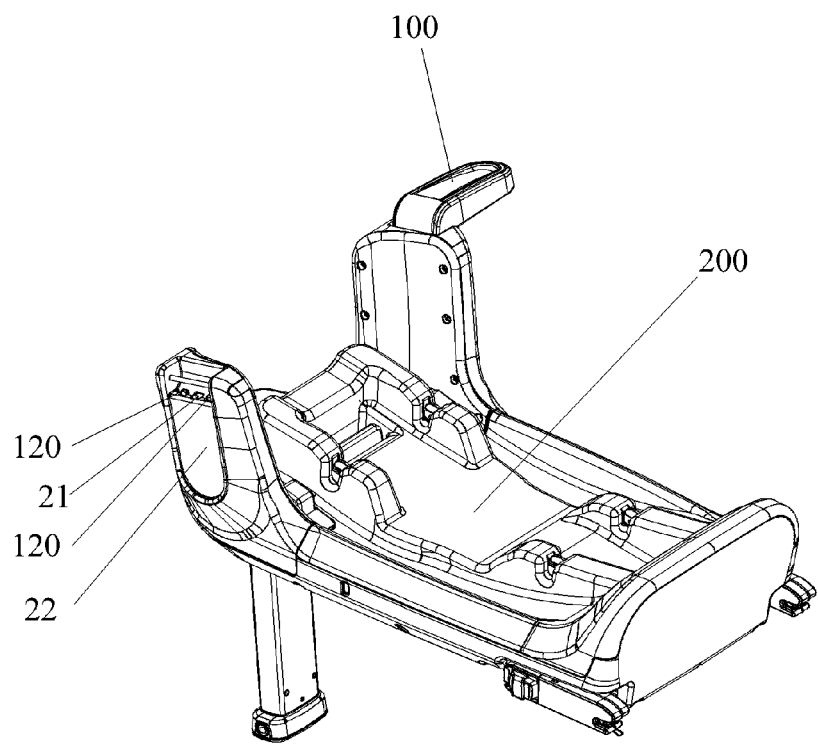
FIG. 4 is a schematic view illustrating one side impact protection block being removed from one side of FIG. 3.
Figure 5:
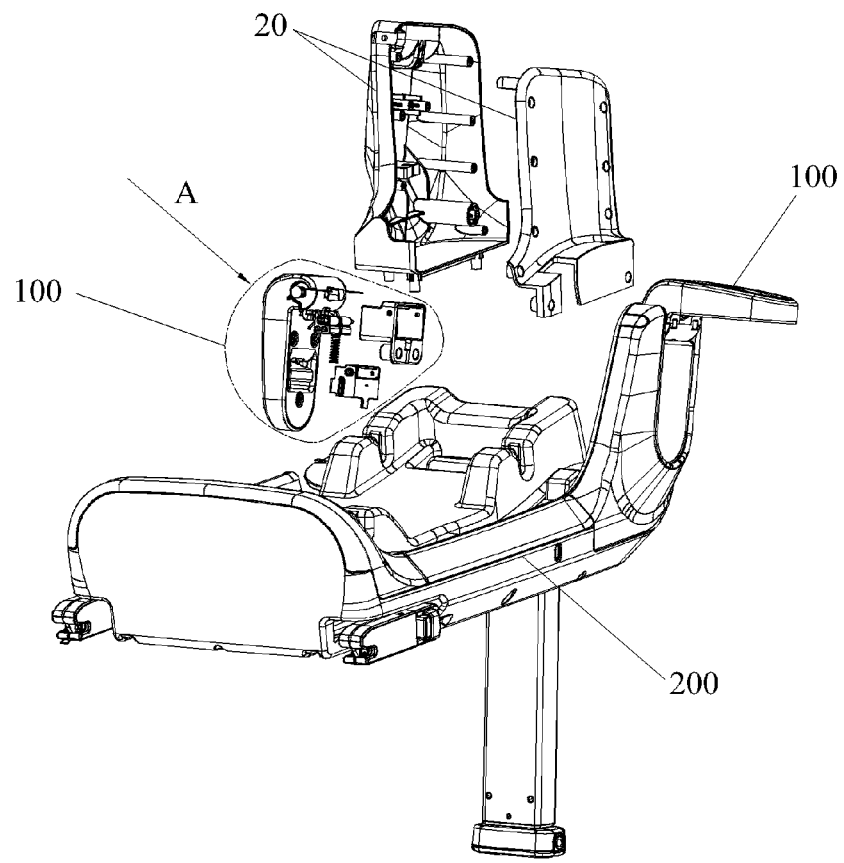
FIG. 5 is an exploded view illustrating a side impact protection linkage mechanism and a safety seat base according to an embodiment of the invention.
Figure 11:
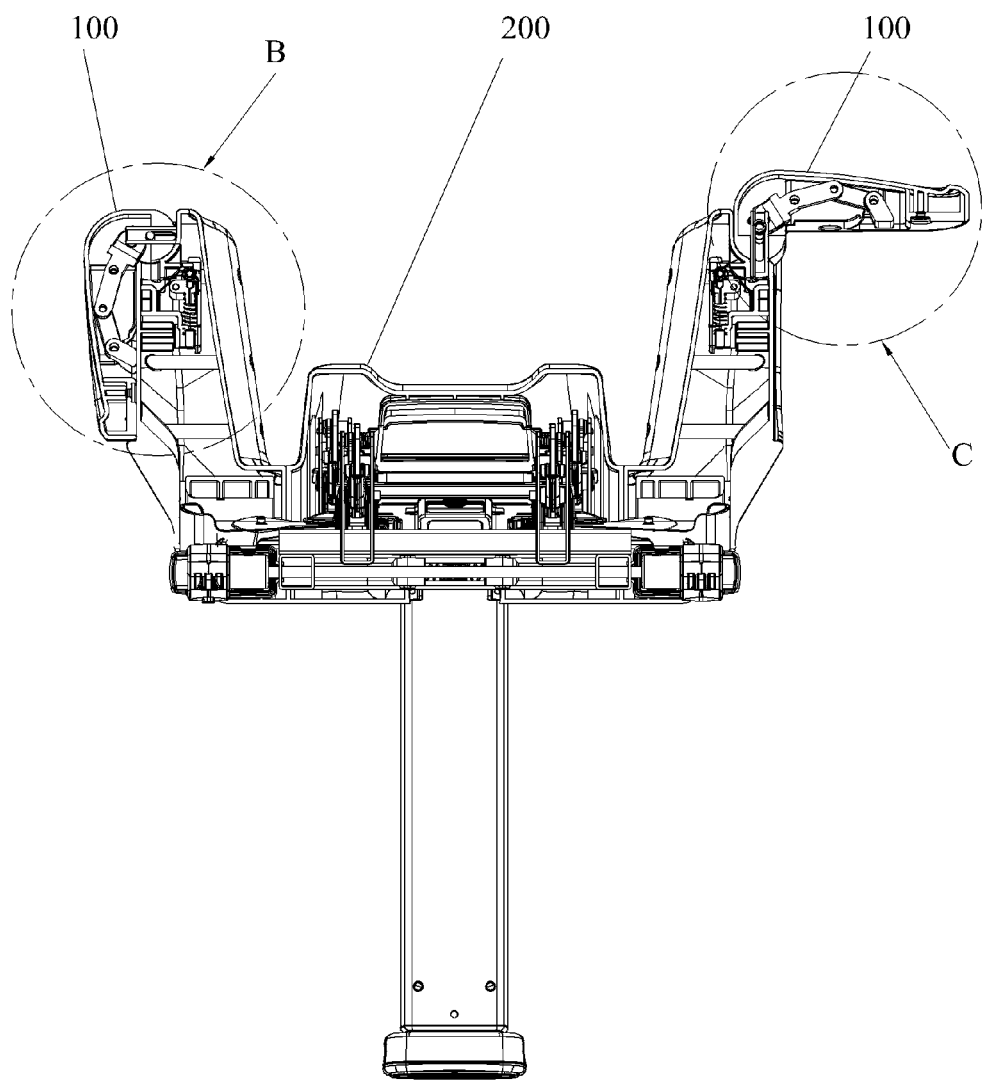
FIG. 11 is a perspective view illustrating a safety seat base according to an embodiment of the invention, wherein the viewing direction is defined from the back of the safety seat base.
Figure 12:
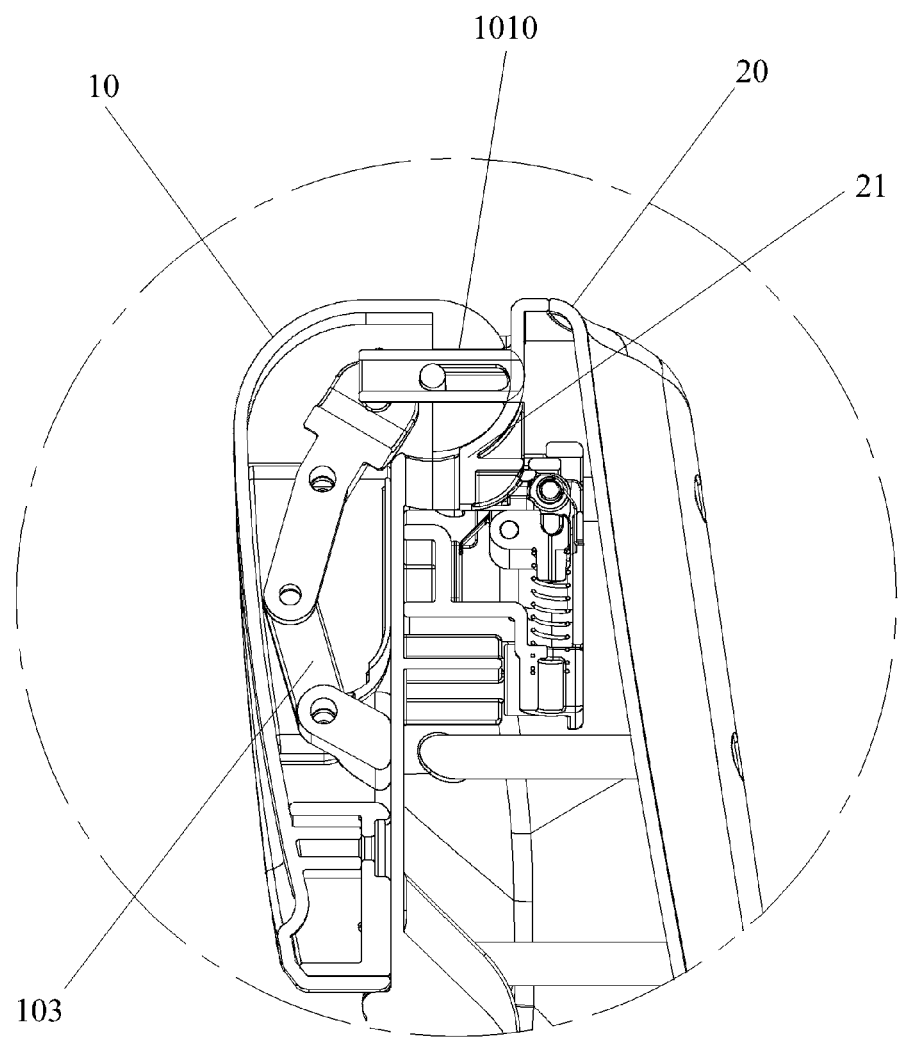
FIG. 12 is an enlarged view illustrating an area B shown in FIG. 11.
Figure 13:
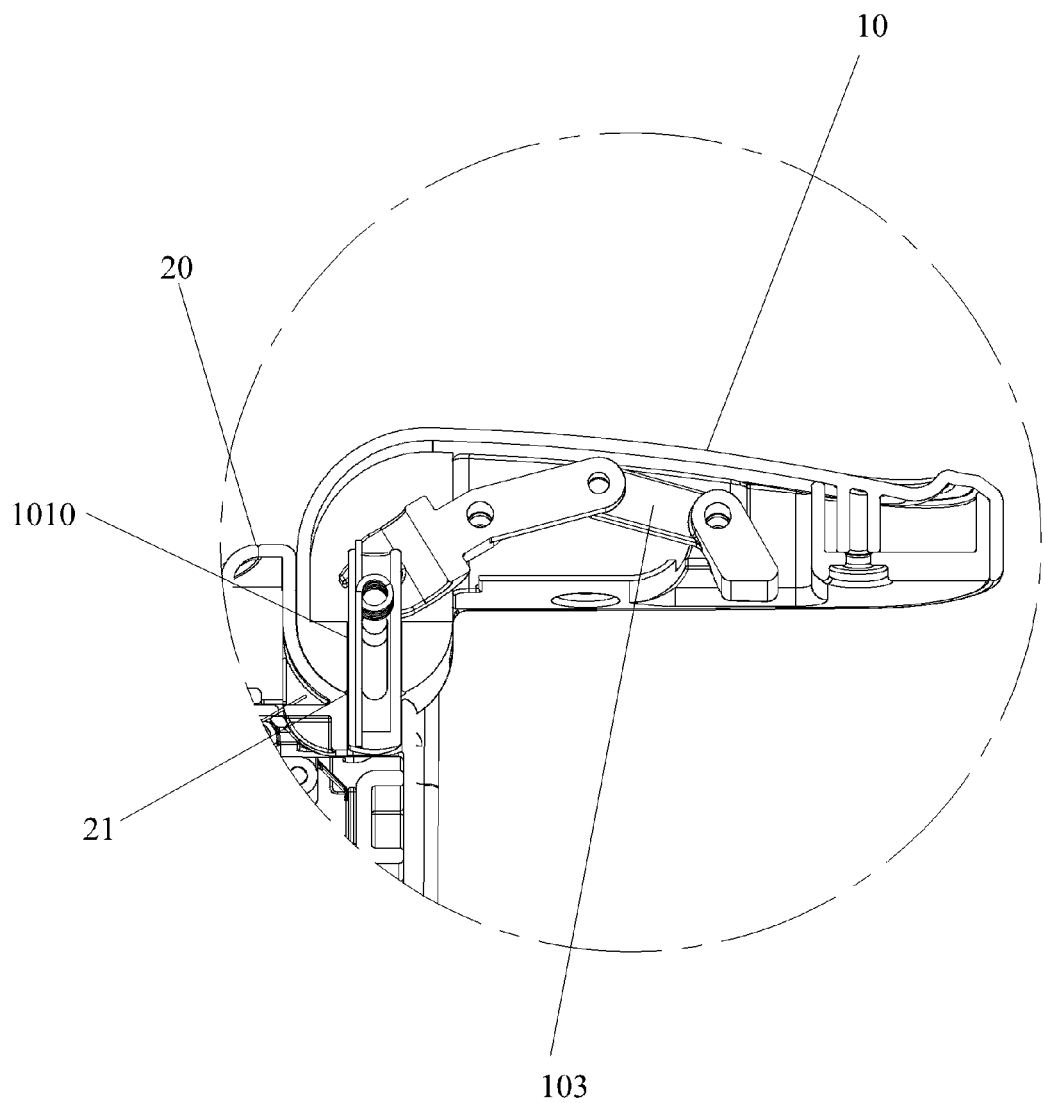
FIG. 13 is an enlarged view illustrating an area C shown in FIG. 11.

Referring to FIGS. 4, 6, and 8, when the side impact protection block 10 is located at the expanded position, in order to position the side impact protection block 10 well, the pivot socket 101 has a positioning member 1010 capable of sliding into or out of the pivot socket 101. Furthermore, the pivot socket 101 has an opening 1012 for the positioning member 1010 to move in and out. The side wall 20 of the safety seat base 200 has a positioning hole 21 corresponding to the positioning member 1010. When the side impact protection block 10 rotates to the expanded position, the positioning member 1010 enters the positioning hole 21 (as shown in FIGS. 11 and 13) to lock the side impact protection block 10 at the expanded position. When the side impact protection block 10 rotates to the folded position, the positioning member 1010 ejects from the positioning hole 21 (as shown in FIGS. 11 and 12). In this embodiment, when the side impact protection block 10 rotates to the expanded position, the positioning member 1010 automatically enters the positioning hole 21, such that the side impact protection block 10 is positioned by cooperation between the positioning member 1010 and the positioning hole 21. Furthermore, the pivot socket 101 further has an engaging hole 1011 adapted to the lock portion 120 of the engaging member 12. When the side impact protection block 10 rotates to the folded position, the lock portion 120 automatically enters the engaging hole 1011, such that the side impact protection block 10 is fixed at the folded position by cooperation between the lock portion 12 and the engaging hole 1011. Preferably, in order to facilitate the fixing and installation of the support frame 11, in this embodiment, the support frame 11 is connected to the side wall 20 of the side impact protection block 10 by an installation frame 15.

Figure 9:
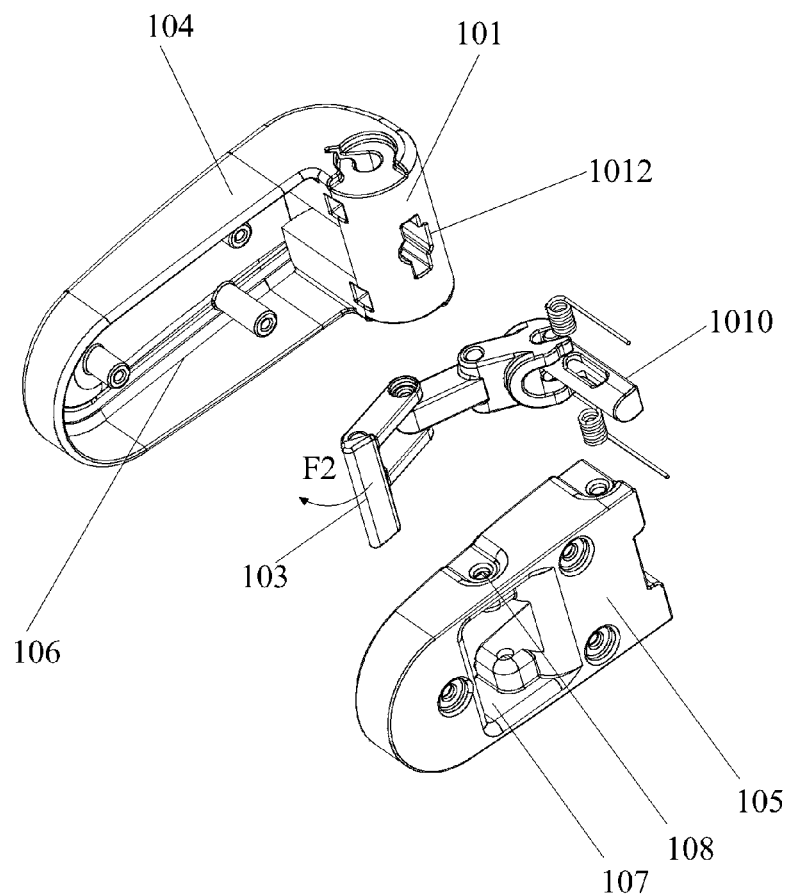
FIG. 9 is an exploded view of FIG. 8.
Figure 10:
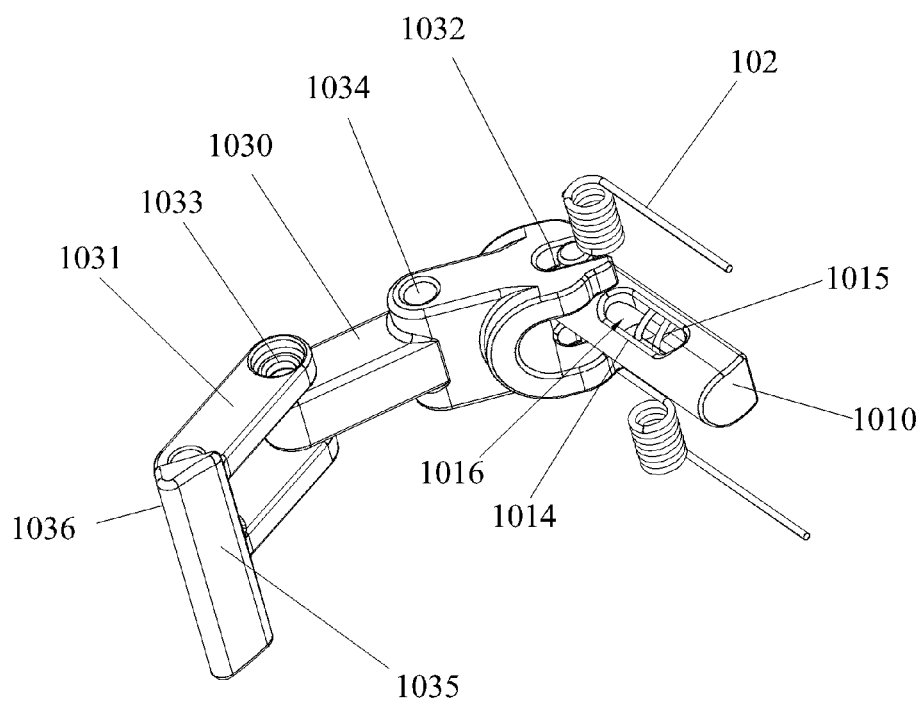
FIG. 10 is an enlarged view illustrating an unlock member shown in FIG. 8.

As shown in FIGS. 9 and 10, when the safety seat base 200 is in an idle state, in order to facilitate the folding process of the side impact protection block 10, the side impact protection block 10 further has an unlock member 103 connected to the positioning member 1010 and the unlock member 103 is operated to remove the positioning member 1010 from the positioning hole 21. Preferably, the unlock member 103 includes a first linkage rod 1030 and a second linkage rod 1031. The first linkage rod 1030 has a first pivot portion 1032, a second pivot portion 1033, and a third pivot portion 1034, wherein the first pivot portion 1032 and the second pivot portion 1033 are located at opposite ends of the first linkage rod 1030, and the third pivot portion 1034 is located between the first pivot portion 1032 and the second pivot portion 1033. The first linkage rod 1030 is pivotally connected to the positioning member 1010 by the first pivot portion 1032. The first linkage rod 1030 is pivotally connected to the second linkage rod 1031 by the second pivot portion 1033. The first linkage rod 1030 is pivotally connected to the side impact protection block 10 by the third pivot portion 1034. An end of the second linkage rod 1031 has an operating portion 1035 away from the first linkage rod 1030. The operating portion 1035 has a rib 1036 protruding toward a bottom wall of the side impact protection block 10. Through the rib 1036, an angle included between extension directions of the first linkage rod 1030 and the second linkage rod 1031 in a natural state. When the side impact protection block 10 needs to be folded from the expanded position to the folded position, the operating member 1035 of the second linkage rod 1031 is pulled along a direction indicated by an arrow F2 shown in FIG. 9. Then, another end of the second linkage rod 1031 drives a tip end of the second pivot portion 1033 of the first linkage rod 1030 to arch downward on the rib 1036, such that a front end of the first linkage rod 1030 tilts upward on the third pivot portion 1034, so as to drive the positioning portion 1010 to eject from the positioning hole 21 and enters the pivot socket 101. The unlock member 103 of this embodiment has the advantages of simple structure and convenient operation.

In order to facilitate the installation of the unlock member 103, as shown in FIG. 9, the side impact protection block 10 includes an outer casing 104 and an inner casing 105 screwed together. The pivot socket 101 is located on the outer casing 104 and the pivot socket 101 is a hollow structure. The outer casing 104 has an accommodating recess 106 for accommodating the first linkage rod 1030 and the second linkage rod 1031. The accommodating recess 106 communicates with a hollow chamber in the pivot socket 101. A side wall of the inner casing 105 has a pivot hole 108 for pivotally connecting the third pivot portion 1034 of the first linkage rod 1030. Still further, the inner casing 105 has a through hole 107 communicating with the accommodating recess 106. The operating portion 1035 of the second linkage rod 1031 passes through the through hole 107 of the inner casing 105 to be exposed from the outside of the side impact protection block 10.

The specific connection structure between the first linkage rod 1030 and the positioning member 1010 is preferably shown in FIG. 10. A hollow chamber 1016 is formed in the positioning member 1010. A side wall of the positioning member 1010 has a second longitudinal groove 1014 communicating with the hollow chamber 1016. A pivot shaft of the side impact protection block 10 passes through the second longitudinal groove 1014 and the hollow chamber 1016. When the first linkage rod 1030 drives the positioning member 1010 to tilt upward, the positioning member 1010 moves upward along the pivot shaft of the side impact protection block 10 through the second longitudinal groove 1014. Moreover, a second elastic member 1015 may be further disposed in the hollow chamber 1016 of the positioning member 1010. The second elastic member 1015 provides an elastic force for driving the positioning member 1010 to automatically extend out of the pivot socket 101.

The operation of the safety seat base with the side impact protection linkage mechanism 100 of the invention will be described with reference to FIGS. 1 to 14 in the following.

If the safety seat base 200 does not need to be used, the side impact protection block 10 is folded in a storage recess 22 on the side wall 20. The lock portion 120 of the engaging member 12 extends out of the side wall 20 and engages in the engaging hole 1011 of the side impact protection block 10, so as to lock the side impact protection block 10 at the folded position. At this time, the positioning member 1010 is compressed by the side wall 20 to retract into the pivot socket 101 of the side impact protection block 10 and compress the second elastic member 1015 simultaneously.

When the seat body 300 is installed on the safety seat base 200, the bottom of the seat body 300 pushes the protruding portion 140 disposed on the safety seat base 200 to drive the driving member 14 to rotate. The driving member 14 pulls the engaging member 12 through the steel wire and the linkage member 13 to slide along a direction indicated by an arrow F1 shown in FIG. 14 and then the lock portion 120 of the engaging member 12 is separated from the engaging hole 1011 of the side impact protection block 10. At this time, the side impact protection block 10 is ejected by a pushing force of the second torsion spring 102 and rotates from the folded position to the expanded position. Furthermore, the driving member 14 rotates to deform the elastic member 141 and the engaging member 12 rotates to deform the first torsion spring 122 simultaneously.

After the side impact protection block 10 rotates and ejects, the position of the positioning member 1010 of the side impact protection block 10 corresponds to the positioning hole 21 on the side wall 20 of the safety seat base 200. Since the positioning member 1010 is not pressed by the side wall 20, the positioning member 1010 ejects and engages into the engaging hole 21 by the action of the second elastic member 1015, such that the side impact protection block 10 is kept at the expanded position by the positioning member 1010.

When the side impact protection block 10 needs to be folded, the operating portion 1035 of the second linkage rod 1031 is pulled to pull the positioning member 1010 out of the positioning hole 21 through the first linkage rod 1030. When the positioning member 1010 is disengaged from the positioning hole 21, the side impact protection block 10 can be pushed to rotate to the folded position. Then, the seat body 300 is detached. Since the protruding portion 140 of the driving member 14 is not pressed by the seat body 300, the driving member 14 rotates to return by the action of the elastic member 141. The pulling force on the steel wire disappears and the linkage member 13 returns by the action of the second torsion spring, such that the engaging member 12 returns by the action of the first torsion spring 122. Consequently, the lock portion 120 of the engaging member 12 enters the engaging hole 1011 of the pivot socket 101 to lock the side impact protection block 10.

Due to the innovative arrangement of the side impact protection linkage mechanism of the invention, the safety seat base 200 has the side impact protection effect and the linkage mechanism for controlling the side impact protection block 10 is optimized, such that the movement of the side impact protection block 10 is more sensitive and the structure is simple and easy to manufacture.

The invention claimed is:

1. A side impact protection linkage mechanism applied to a safety seat base, comprising:
 a side impact protection block pivotally connected to a side wall of the safety seat base and having a folded position attached to the side wall and an expanded position away from the side wall, the side impact protection block having a tendency to rotate to the expanded position;
 a support frame disposed in the side wall;
 an engaging member disposed on the support frame;
 an end of the engaging member being pivotally connected to the support frame, another end of the engaging member having a lock portion protruding from the side wall;
 the engaging member being detachably engaged with the side impact protection block through the lock portion, so as to lock the side impact protection block at the folded position and unlock the side impact protection block from the folded position;

a linkage member disposed on the support frame and below the engaging member, the linkage member being capable of sliding upward and downward along the support frame to drive the engaging member to rotate, wherein the linkage member slides downward along the support frame to drive the engaging member to rotate downward, such that the lock portion is able to be disengaged from the side impact protection block; and a driving member disposed on the safety seat base and connected to the linkage member.

2. The side impact protection linkage mechanism of claim 1, wherein the linkage member has a hook portion extending toward the engaging member and the engaging member has a wing plate adapted to the hook portion; when the linkage member moves downward, the hook portion cooperates with the wing plate to drive the engaging member to rotate downward.

3. The side impact protection linkage mechanism of claim 2, wherein the support frame has two first longitudinal grooves opposite to each other, the linkage member has two protruding shafts adapted to the two first longitudinal grooves, and the linkage member is slidably connected to the support frame by cooperation between the two protruding shafts and the two first longitudinal grooves.

4. The side impact protection linkage mechanism of claim 2, wherein a first elastic member is disposed between a lower end of the linkage member and the support frame, and the first elastic member provides an elastic force for driving the linkage member to move upward along the support frame.

5. The side impact protection linkage mechanism of claim 2, wherein a first torsion spring is sleeved on a pivot shaft of the engaging member and the first torsion spring is configured to drive the engaging member to rotate upward.

6. The side impact protection linkage mechanism of claim 1, wherein the driving member is connected to the linkage member by a drag member.

7. The side impact protection linkage mechanism of claim 6, wherein an end of the driving member is pivotally connected to the safety seat base, another end of the driving member has a protruding portion protruding from the safety seat base, and the drag member is connected to an end of the driving member where the protruding portion is located at.

8. The side impact protection linkage mechanism of claim 7, wherein an elastic member is disposed between the driving member and the safety seat base and configured to automatically return the driving member.

9. The side impact protection linkage mechanism of claim 1, wherein the side impact protection block is pivotally connected to the side wall of the safety seat base by a pivot socket, a second torsion spring is sleeved on a pivot shaft of the pivot socket, and the second torsion spring provides a driving force for driving the side impact protection block to rotate toward the expanded position.

10. The side impact protection linkage mechanism of claim 9, wherein the pivot socket has a positioning member capable of sliding into or out of the pivot socket and the side wall of the safety seat base has a positioning hole corresponding to the positioning member; when the side impact protection block rotates to the expanded position, the positioning member enters the positioning hole to lock the side impact protection block at the expanded position.

11. The side impact protection linkage mechanism of claim 10, wherein the pivot socket further has an engaging hole adapted to the lock portion of the engaging member; when the side impact protection block rotates to the folded position, the lock portion cooperates with the engaging hole to fix the side impact protection block at the folded position.

12. The side impact protection linkage mechanism of claim 10, wherein the side impact protection block further has an unlock member connected to the positioning member and the unlock member is operated to remove the positioning member from the positioning hole.

13. The side impact protection linkage mechanism of claim 12, wherein the unlock member comprises a first linkage rod and a second linkage rod; the first linkage rod has a first pivot portion, a second pivot portion and a third pivot portion, the first pivot portion and the second pivot portion are located at opposite ends of the first linkage rod, the third pivot portion is located between the first pivot portion and the second pivot portion; the first linkage rod is pivotally connected to the positioning member by the first pivot portion, the first linkage rod is pivotally connected to the second linkage rod by the second pivot portion, the first linkage rod is pivotally connected to the side impact protection block by the third pivot portion, an end of the second linkage rod has an operating portion away from the first linkage rod, and the operating portion has a rib protruding toward a bottom wall of the side impact protection block.

14. The side impact protection linkage mechanism of claim 13, wherein a hollow chamber is formed in the positioning member, a side wall of the positioning member has a second longitudinal groove communicating with the hollow chamber, and a pivot shaft of the side impact protection block passes through the second longitudinal groove and the hollow chamber.

15. The side impact protection linkage mechanism of claim 14, wherein a second elastic member is disposed in the hollow chamber and the second elastic member provides an elastic force for driving the positioning member to automatically extend out of the pivot socket.

16. A safety seat base comprising the side impact protection linkage mechanism of claim 1 disposed on the safety seat base.

* * * * *